US008601166B2

(12) United States Patent
Fujiwaka

(10) Patent No.: US 8,601,166 B2
(45) Date of Patent: Dec. 3, 2013

(54) INFORMATION PROCESSING SYSTEM AND INFORMATION PROCESSING METHOD FOR GENERATING DISTRIBUTION AND SYNCHRONIZATION RULES IN A CLIENT/SERVER ENVIRONMENT BASED ON OPERATION ENVIRONMENT DATA

(75) Inventor: Masaya Fujiwaka, Tokyo (JP)

(73) Assignee: NEC Corporation, Tokyo (JP)

( * ) Notice: Subject to any disclaimer, the term of this patent is extended or adjusted under 35 U.S.C. 154(b) by 289 days.

(21) Appl. No.: 12/992,672

(22) PCT Filed: May 13, 2009

(86) PCT No.: PCT/JP2009/058946
§ 371 (c)(1),
(2), (4) Date: Dec. 1, 2010

(87) PCT Pub. No.: WO2009/139426
PCT Pub. Date: Nov. 19, 2009

(65) Prior Publication Data
US 2011/0072082 A1 Mar. 24, 2011

(30) Foreign Application Priority Data

May 14, 2008 (JP) .................................. 2008-127759

(51) Int. Cl.
*G06F 15/16* (2006.01)
(52) U.S. Cl.
USPC ........... 709/248; 709/224; 707/610; 707/617; 707/623; 707/637
(58) Field of Classification Search
USPC .......... 709/203, 223, 224, 248; 707/610, 617, 707/623, 637
See application file for complete search history.

(56) References Cited

U.S. PATENT DOCUMENTS 6,385,636 B1* 5/2002 Suzuki ........................ 718/105
7,062,768 B2* 6/2006 Kubo et al. .................. 718/105
(Continued)

FOREIGN PATENT DOCUMENTS

JP 9-16534 A 1/1997
JP 9-198357 A 7/1997
(Continued)

OTHER PUBLICATIONS

International Search Report for PCT/JP2009/058946 mailed Jun. 9, 2009.
(Continued)

*Primary Examiner* — Patrice Winder
*Assistant Examiner* — Eyob Hagos

(57) ABSTRACT

In an information processing system, a client terminal includes a client process executing section issuing a request; a client execution control section generating a distribution rule based on an instruction from the server apparatus and operation environment data of the client terminal; a distributing section determining whether or not the request should be processed by the client terminal or by the server apparatus, based on the distribution rule, distributing the request to the server apparatus when it is determined that the request should be processed by the server apparatus, and returning a received processing result to the client process executing section; and a client side server process executing section executing the request when it is determined when the request should be processed by the client terminal, and notifying a processing result to the distributing section. A server apparatus includes a server side server process executing section executing the request received from the client terminal through the network and notifying a processing result to the distributing section; and a system execution control section issuing the instruction to the client execution control section based on operation environment data of the server apparatus.

12 Claims, 11 Drawing Sheets

(56) References Cited

U.S. PATENT DOCUMENTS

| | | | |
|---|---|---|---|
| 7,437,441 B1* | 10/2008 | Drew et al. | 709/223 |
| 7,594,003 B2* | 9/2009 | Davidson et al. | 709/219 |
| 8,195,605 B2* | 6/2012 | Chellappa et al. | 707/610 |
| 2004/0225717 A1* | 11/2004 | Cuervo | 709/206 |
| 2006/0106881 A1* | 5/2006 | Leung et al. | 707/200 |
| 2006/0167858 A1* | 7/2006 | Dennis et al. | 707/3 |
| 2006/0184591 A1* | 8/2006 | Backholm et al. | 707/204 |
| 2008/0083014 A1* | 4/2008 | Lim | 726/1 |
| 2009/0165021 A1* | 6/2009 | Pinkston et al. | 719/314 |
| 2009/0228594 A1* | 9/2009 | Lotlikar et al. | 709/228 |

FOREIGN PATENT DOCUMENTS

| | | | |
|---|---|---|---|
| JP | 2006107185 A | | 4/2006 |
| JP | 2006309701 A | | 11/2006 |
| JP | 2007226719 | * | 6/2007 |
| JP | 2007-226508 A | | 9/2007 |
| JP | 2007226719 A | * | 9/2007 |
| JP | 2008083897 A | | 4/2008 |
| WO | 2004099985 A | | 11/2004 |
| WO | 2006/051967 A1 | | 5/2006 |

OTHER PUBLICATIONS

H. Takahashi, "Part4 Daikiboka Scalability de RDB ni Ichinichi no Cho", Nikkei Byte, Mar. 22, 2004, vol. 251, pp. 38-43.

Japanese Office Action for JP Application No. 2010-512009 mailed on May 16, 2013 with English Translation.

* cited by examiner

Fig. 2

```
Server: sample_server
Application: Scheduler

Request: /look_schedule_this_week.html
    NORMAL OPERATION: EXECUTION IN CLIENT TERMINAL
    SYNC. STORAGE: CLIENT DATABASE A: RECENT 1-WEEK DATA
    SYNC. TYPE: COPY
    SYNC. TIMING: EVERYDAY 24:00
Request: /write_schedule.cgi
    STANDARD OPERATION: EXECUTION IN SERVER APPARATUS
    CONDITION:
        IF CANNOT BE CONNECTED TO SERVER APPARATUS:
        CHANGE TO EXECUTION BY CLIENT TERMINAL
    SYNC. STORAGE: CLIENT DATABASE B
    SYNC. TYPE: MOVE
    SYNC TIMING: WHEN NETWORK CONNECTION IS MADE POSSIBLE

OTHERS: EXECUTION IN SERVER APPARATUS
```

Fig. 3

```
/function.cgi
    NORMAL OPERATION: EXECUTION IN SERVER APPARATUS
    CONDITION (PRIMARY):
        IF SERVER (CPU) AVERAGE/5 MINUTES EXCEEDS 90%:
        CHANGE TO EXECUTION BY CLIENT TERMINAL
    SYNC. REQUIRED STORAGE: NO
```

INFORMATION PROCESSING SYSTEM AND INFORMATION PROCESSING METHOD FOR GENERATING DISTRIBUTION AND SYNCHRONIZATION RULES IN A CLIENT/SERVER ENVIRONMENT BASED ON OPERATION ENVIRONMENT DATA

TECHNICAL FIELD

The present invention relates to an information processing system and an information processing method, and more particularly, to a client/server information processing method and a client/server information processing system for the same.

BACKGROUND ART

In recent years, a client/server system becomes widespread, in which a client terminal and a server apparatus are communicably connected through a network. An information processing service is provided to a user of the client terminal by executing predetermined information processing by the server apparatus in response to a request transmitted from the client terminal.

Also, as described in Japanese Patent Publications (JP 2007-226719A, JP-A-Heisei 9-198357, JP 2006-107185A and JP-A-Heisei 9-016534), techniques are also developed in which the information processing of an application that is being executed by the server apparatus is shifted to the client terminal and executed there, in response to operation environment of the client terminal or the server apparatus.

In the above Japanese Patent Publication (JP 2007-226719A), even if the operation environment is changed, the application is efficiently executed. A server determines configuration information on a first platform, and a client downloads client configuration information from the server. The server and the client assemble the configuration on the basis of server configuration information and the client configuration information, respectively. Also, each of the server and the client determines whether or not re-balance processing should be started by a re-balance controller which periodically calls a re-balance adviser. In this way, the dynamic re-configuration (re-balance) that involves movement or exchange in units of functions of the configuration is carried out in accordance with current operation environment.

Also, in the above Japanese Patent Publication (JP-A-Heisei 9-198357), in a client/server system, a load due to the start of an application program is effectively distributed. In the client/server system, the server obtains its own CPU load information and controls the start of the application program possessed by itself. When a value of the CPU load information of the server is equal to or greater than a threshold of the load, the client requires the start of the application program in the client, and in a case of being less than the threshold of the load, the client requires the start of the application program in the server. Also, the client controls the start of each application program in response to a start request.

Moreover, in the above Japanese Patent Publication (JP 2006-107185A), in a server-based computation environment, even in a place in which network connection is impossible, the same environment as environment attained by the server is safely provided to a user on a terminal. A virtual computer is configured on the server, and the application program is executed on the virtual computer by the client. When the client is disconnected, data required to configure the virtual computer is converted into a file and transferred to the client in its original state. The processing is continued on the client by the virtual computer configured from the received file.

On the other hand, in Japanese Patent Publication (JP-A-Heisei 9-016534), in the environment of computers that are coupled through a network and uniformly or non-uniformly distributed, a job from a user is efficiently distributed and executed on the server. For a process flow of an application program for the job from the user, an agent process is generated between a client process and a server process. The job requested by the client process is distributed to the server processes by the agent process and executed therein on the basis of information of hardware resources such as a static performance of a computer and a dynamic change of load situation, and information of software resources such as data associated with a program module in the computer environment.

Here, when the processing of an application program being executed by the server apparatus is shifted to the client terminal, a communication has to be carried out in order to check the operation situation between the client terminal and the server apparatus. For this reason, in a conventional technique, it is difficult to shift the information processing when the communication became impossible between the client terminal and the server apparatus.

In the technique described in the Japanese Patent Publication (JP 2007-226719A), when the module is re-configured on the basis of change in environment, communications are carried out to notify environment information from the client to the server or to download the module into the client. The technique cannot deal with a situation in which the network is disconnected. In particular, such a situation cannot be determined on the basis of only the environment information of the server, and it is necessary to determine only on the client side. Also, transmission to and reception from the server are impossible, and countermeasure software cannot be received from the server.

Also, in the technique described in the Japanese Patent Publication (JP-A-Heisei 9-198357), since communication is required to acquire the CPU load information of the server, the technique cannot deal with the situation in which the network is disconnected.

Also, the Japanese Patent Publication (JP 2006-107185A) discloses that when the user disconnects a client from the server, personal environment information at that time is duplicated on the client as it is. However, any duplication of the personal environment information for unpredicted disconnection such as disconnection when a Shinkansen train passes through a tunnel is not described at all.

Moreover, the Japanese Patent Publication (JP-A-Heisei 9-016534) discloses that both of the client and the server have processes, and the processes are generated or deleted on the basis of the load situation. However, even in this case, when the communication becomes impossible between the client terminal and the server apparatus, it is difficult to shift the information processing.

CITATION LIST

[Patent Literature 1]: JP 2007-226719A
[Patent Literature 2]: JP-A-Heisei 9-198357
[Patent Literature 3]: JP 2006-107185A
[Patent Literature 4]: JP-A-Heisei 9-016534

SUMMARY OF THE INVENTION

An object of the present invention is to provide an information processing system, a server apparatus, a client terminal and an information processing method, in which information processing can be shifted even if communication becomes impossible between the client terminal and the server apparatus.

In a first aspect of the present invention, an information processing system includes a client terminal and a server apparatus that are connected through a network. The client terminal includes: a client database; a client process executing section for issuing a request; a client execution control section for generating a distribution rule based on operation environment data of the client terminal and an instruction from the server apparatus; a distributing section that determines whether the request is processed by the client terminal or by the server apparatus, based on the distribution rule, and distributes the request to the server apparatus when the request is determined to be processed by the server apparatus, and then returns the received processing result to the client process executing section; and a client side server process executing section that executes the request if the request is determined to be processed by the client terminal and then notifies the processing result to the distributing section. The server apparatus includes: a server database; a server side server process executing section that executes the request received from the client terminal through the network and notifies the processing result to the distributing section; and a system execution control section which issues the instruction to the client execution control section, based on operation environment data of the server apparatus. The client database and the sever database stores shared data, and the request is addressed to the sever database.

In a second aspect of the present invention, an information processing method includes a client terminal having a client database and a server apparatus having a sever database, and the client terminal and the server apparatus are operated in environment in which they are connected through a network. The information processing method is achieved by: issuing an instruction from the server apparatus to the client terminal based on operation environment data of the server apparatus; generating a distribution rule based on operation environment data of the client terminal and the instruction from the server apparatus; executing a client process and issuing a request, by the client terminal; determining whether the request is processed by the client terminal or by the server apparatus, based on the distribution rule, by the client terminal; executing the request by the client terminal, if the request is determined to be processed by the client terminal, and then returning the processing result to a client process executing section; and processing the request by the server apparatus if the request is determined to be processed by the server apparatus and then returning the processing result to the client process. The client database and the sever database store shared data, and the request is addressed to the sever database.

A computer-readable recording medium that stores a computer-executable program code to attain the above information processing method is also included in the present invention.

In the client/server system according to the present invention, the information processing of an application that is usually executed in the server apparatus can be efficiently switched between the client terminal and the server apparatus, based on the operation environments of the client terminal and the server apparatus. In particular, the present invention has an effect that the application can be executed in continuation only by the client terminal, even in the situation in which the network is disconnected.

BRIEF DESCRIPTION OF THE DRAWINGS

The advantages and features of the present invention will be described below through the following descriptions with reference to the attached drawings:

FIG. 2 is a diagram showing one example of a client policy in the present invention;

FIG. 3 is a diagram showing one example of a server policy in the present invention;

DESCRIPTION OF EXEMPLARY EMBODIMENTS

An information processing system 1000 according to the present invention will be described below in detail with reference to the attached drawings.

Figure 1:
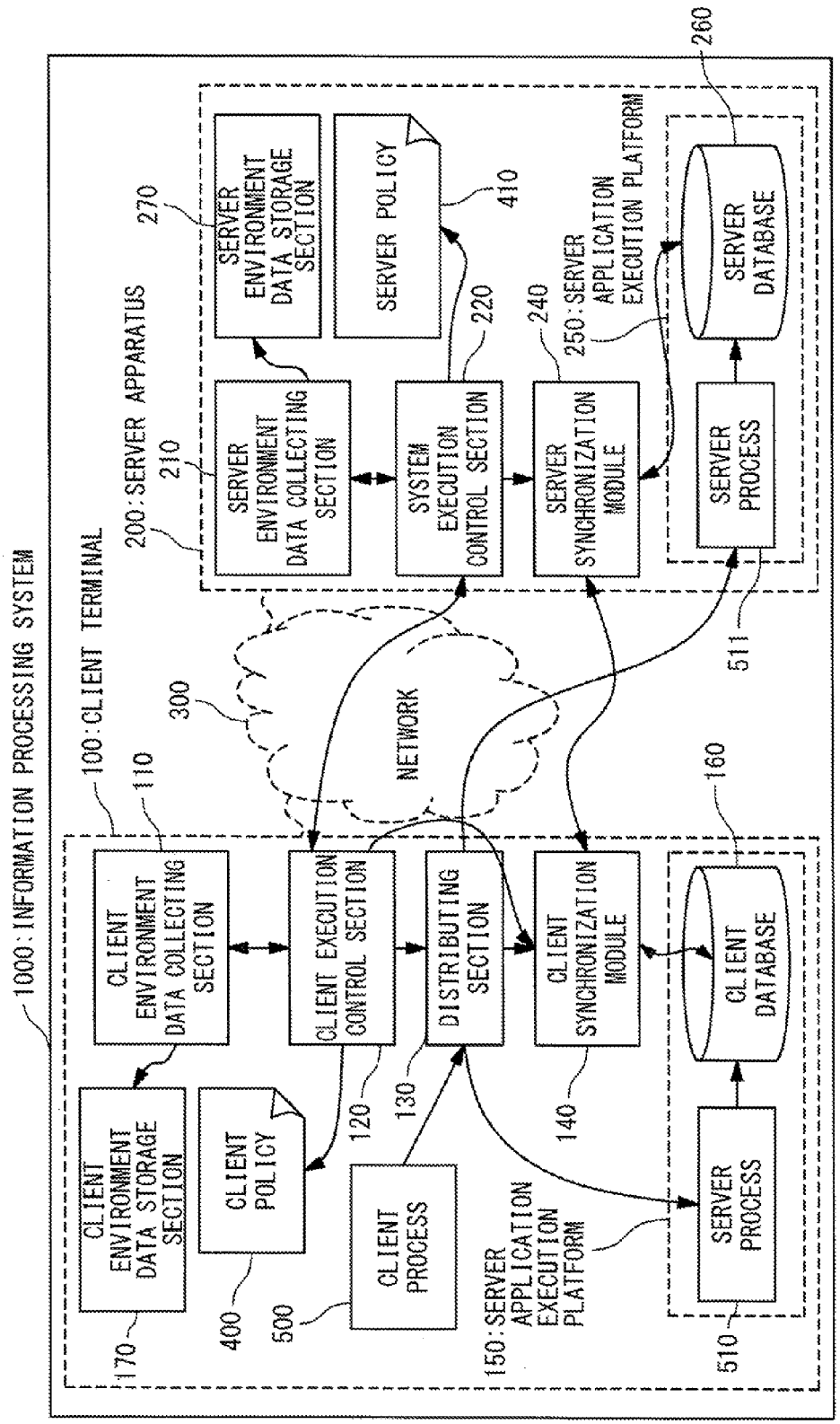
FIG. 1 is a block diagram showing a configuration of an information processing system according to an exemplary embodiment of the present invention.

As shown in FIG. 1, in the information processing system 1000 according to an exemplary embodiment of the present invention, a client terminal 100 and a server apparatus 200 are communicably connected through a network 300. The client terminal 100 is an information processing apparatus used by a user upon reception of an information processing service from the server apparatus 200. The client terminal 100 is configured from electronic apparatus such as a PC (Personal Computer), a mobile phone, an electronic datebook, PDA (Personal Digital Assistant), a watch, a car navigation system, and electronic equipment installed in a car. Also, the server apparatus 200 is an information processing apparatus for providing the information processing service to the user, and similarly to the client terminal 100, and is configured from electronic apparatus such as a PC (Personal Computer), a mobile phone, an electronic datebook, PDA (Personal Digital Assistant), a watch, a car navigation system, and electronic equipment installed in a car. The network 300 is a communication path through which the client terminal 100 and the server apparatus 200 are communicably connected. At least a part of the network 300 may be configured by a wireless communication path.

Each of the client terminal 100 and the server apparatus 200 includes a CPU (Central Processing Unit), a memory and a communication unit. Also, each of them properly includes: a nonvolatile storage unit such as a hard disc drive; an input unit such as a keyboard, a mouth, and a microphone; and an output unit such as a display, and a speaker. When the CPU executes various programs stored in the memory to attain various functions of the client terminal 100 or the server apparatus 200. In this case, the program executed by the CPU may be downloaded through the network 300 from a different information processing apparatus or may be loaded to a client apparatus from a tangible recording medium in which the program has been stored.

The user uses the client terminal 100 to access the server apparatus 200 through the network 300 and then to refer to schedule data (to refer to FIG. 5) stored in a sever database 260 in the server apparatus 200. Consequently, the user can browse the schedule data and carry out addition and change of the schedule data.

Also, the client terminal 100 stores a part of the schedule data stored in the sever database 260 of the server apparatus 200, for example, the schedule data for one week from now in a client database 160. Of course, the client terminal 100 may store the entire schedule data, which has been held in the sever database 260, in the client database 160.

According to the information processing system 1000 in the present exemplary embodiment, since the schedule data is stored in the client database 160 of the client terminal 100 as well as the server database, the client terminal 100 can switch from the control to access the schedule data stored in the sever database 260 to the control to access the schedule data stored in the client database 160, even when the client terminal 100 and the server apparatus 200 cannot perform any communication. Thus, the user can continuously receive the browsing and editing service of the schedule data, even if the access to the server apparatus becomes impossible.

For example, it is supposed that the Shinkansen train enters a tunnel, in which the client terminal 100 cannot be connected to the network 300, while the user browses the schedule data of the sever database 260 by using the client terminal 100. In this case, since the client terminal 100 switches to the control to refer to the schedule data stored in the client database 160, the user can browses the schedule data stored in the client terminal 100.

Also, the user can write new schedule data in the tunnel in which the client terminal cannot be connected to the network. In this case, the client terminal 100 once holds the written schedule data in the client database 160 of the client terminal 100. Then, when it is detected that the client terminal can be connected to the network 300, the client database 160 is made synchronized with the sever database 260. Thus, even when the user browses the schedule data by use of a personal computer in the company after that, the schedule data written inside the tunnel is reflected. It should be noted that the synchronization in this case implies that the data stored in the client database 160 is made coincident with the data stored in the sever database 260.

Figure 4:
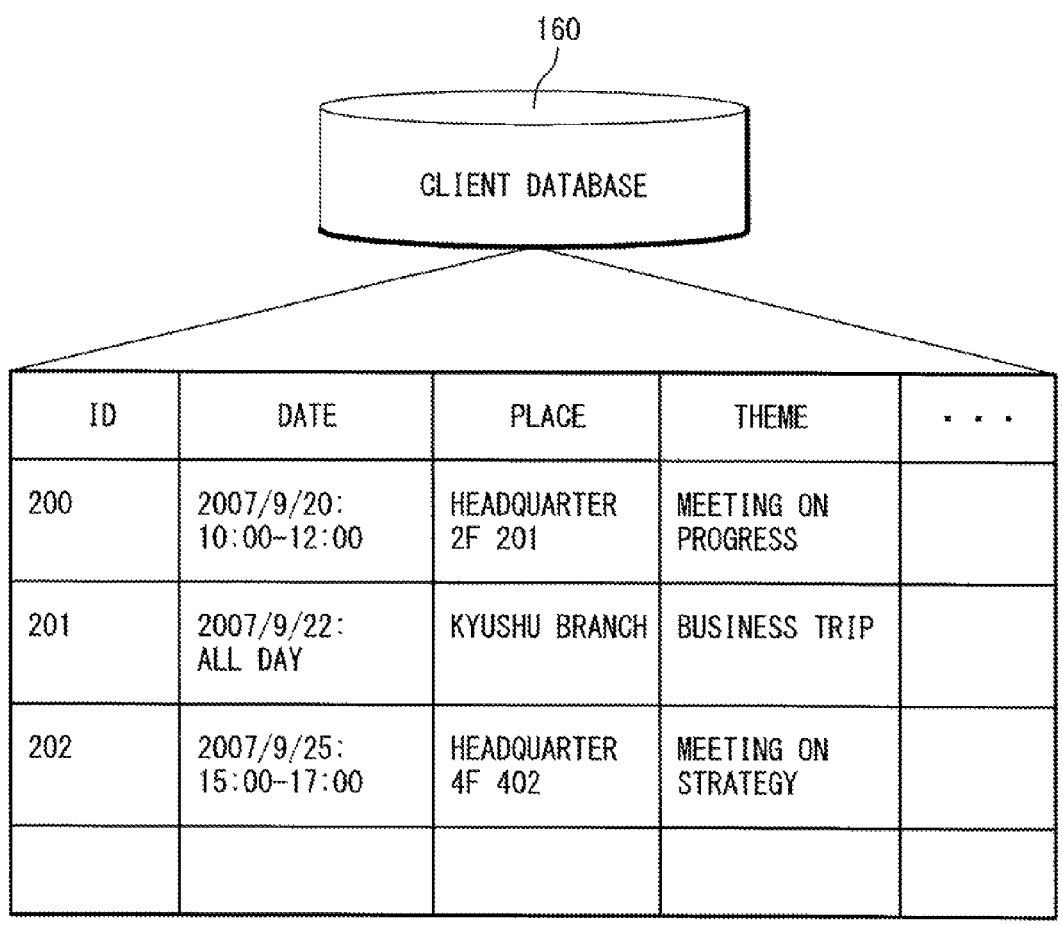
FIG. 4 is a diagram showing one example of a data structure of a client database in the present invention.
Figure 5:
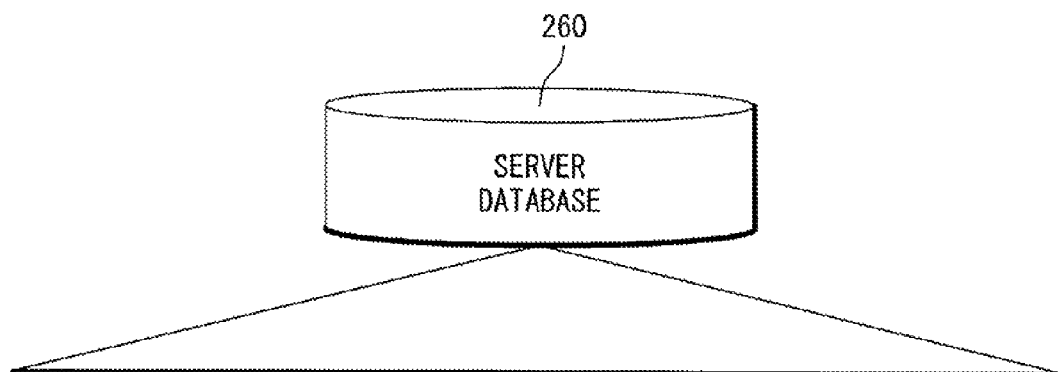
FIG. 5 is a diagram showing one example of a data structure of a sever database in the present invention.

FIG. 5 shows one example of the schedule data stored in the sever database 260. Also, FIG. 4 shows one example of the schedule data stored in the client database 160. As shown in FIG. 5, the schedule data stored in the sever database 260 includes an ID number assigned to each user; a date and time data that includes date, start time and end time of an event; occurrence place data of the event; and a theme data of the event, as one example. Also, as shown in FIG. 4, similarly to FIG. 5, the schedule data stored in the client database 160 includes the ID number assigned to each person; the date and time data that includes the date, the start time and the end time of the event; the occurrence place data of the event; and the theme data of the event.

<Client Terminal>

The configuration of the client terminal 100 according to the present exemplary embodiment will be described below. As shown in FIG. 1, the client terminal 100 according to the present exemplary embodiment includes a client environment data collecting section 110, a client execution control section 120, a distributing section 130, a client synchronization module 140, a server application execution platform 150, an executing section 500 for executing a client process, a client policy storage section 400 for storing a client policy, and a client environment data storage section 170. The server application execution platform 150 includes a server process executing section 510 and the client database 160.

The client environment data storage section 170 stores operation environment data. The operation environment data is measured, for example, when the client terminal 100 executes an OS (Operating System). The operation environment data can be updated at any time by the OS. The operation environment data indicates a state of operation environment of the client terminal 100, and includes at least one of a CPU use rate, a memory use rate, a hard disc use rate, a connection state of a network line, a network line rate and so on.

The client environment data collecting section 110 acquires the operation environment data of the client terminal 100 from the client environment data storage section 170. The client environment data collecting section 110 may acquire the operation environment data by measuring the state of operation environment of the client terminal 100. Also, a part of the environment data that cannot be measured by the OS is measured by the client environment data collecting section 110.

The server process executing section 510 is a program executed on the server application execution platform 150 of the client terminal 100. Since the client terminal 100 executes the server process, the process equal to the whole or part of the information processing that is attained when the server apparatus 200 executes a server process 511 is attained.

The client process is a program executed by the executing section 500 of the client terminal 100. The executing section 500 of the client terminal 100 executes the client process and issues an execution request of information processing to the server process and receives the execution result of the information processing from the server process. In short, when the server process is executed in the client terminal 100, a schedule application is executed as the server process without intervention of the network 300. It should be noted that the client process can be configured from a front end program such as a browser.

The client policy storage section 400 stores as client policy, criteria used for the client execution control section 120 to determine whether a request should be processed in the client terminal 100 or in the server apparatus 200, when the request (for example, a browse request of data by specifying URL) is issued from the executing section 500 of the client process. Also, the client policy storage section 400 stores the criteria for data specifying storage sections used when each of the client terminal 100 and the server apparatus 200 processes the request, and a synchronizing method and synchronization timing between the storage sections.

The client execution control section 120 determines whether the request should be processed by the client terminal 100 or the server apparatus 200, and whether or not synchronization between the storage sections should be performed, on the basis of the result of the comparison between the operation environment data of the client terminal 100 and the criteria.

The distributing section 130 distributes the request to the client terminal 100 or the server apparatus 200 which is determined by the client execution control section 120 on the basis of the result of the comparison between the operation environment data of the client terminal 100 and the client policy. The distributing section 130 sends the request to the server process of the client terminal 100 when the request should be processed by the client terminal 100. On the other hand, the distributing section 130 transmits the request through the network 300 to the server apparatus 200 and transfers to the server process of the server apparatus 200 when the request should be processed by the server apparatus 200.

The client synchronization module 140 carries out the synchronization between the storage sections in accordance with the client policy on the basis of the determination result of whether or not the synchronization should be performed by the client execution control section 120.

FIG. 2 shows one example of the client policy storage section 400. As shown in FIG. 2, the client policy contains a "server" field, an "application" field, a "request" field and an "others" field. The "server" field is used to describe data (tor example, a name and an IP address of the server apparatus 200) to specify the server apparatus 200 which provides an information processing service to the client terminal 100. In the example shown in FIG. 2, the data of "sample_server" is described. The "application" field is used to describe data indicating the content of the information processing service that is provided from the server apparatus 200 to the client terminal 100. In the example shown in FIG. 2, the data of "Scheduler" is described. The "request" field is used to describe data specifying a request that is issued from the client process to the server apparatus 200, when the client terminal 100 receives the provision of the above information processing service. In the example shown in FIG. 2, requests of two kinds are described. Each "request" field is used to describe the criterion of whether the request should be processed by the client terminal 100 or the server apparatus 200, when the request is issued. The client execution control section 120 compares the criteria with the operation environment data and consequently determines which unit to execute the above request.

As the contents of the criteria, the fields of "normal operation", "condition", "synchronization storage", "synchronization type" and "synchronization timing" are defined. The "normal operation" field is used to describe a first candidate to execute the request. The "condition" field is used to describe a second candidate and a condition when the second candidate is selected. When the content of the environment data satisfies this condition, the second candidate is selected. It should be noted that when no data is written in the "condition" field, the first candidate is selected.

The "synchronization storage" field is used to describe data indicating the storage data of the client terminal 100 which is required to be coincident (synchronous) with the storage data of the server apparatus 200. The "synchronization type" field is used to describe a synchronizing method. The data "copy" indicates that the synchronization is carried out by writing a replica of data stored in the storage section of the client terminal 100 into the storage of the server apparatus 200. Also, the data "move" indicates that the synchronization is carried out by removing the data stored in the storage section of the client terminal 100, after a replica of data stored in the storage section of the client terminal 100 is written into the storage section of the server apparatus 200.

The "synchronization timing" field is used to describe data indicating timing when the synchronization is carried out. When the environment data coincides with this data, the synchronization is started. For example, it is possible to start the synchronization in response to a predetermined time, or when the communicable state between the client terminal 100 and the server apparatus 200 is detected, it is possible to start the synchronization. The "others" field is used to describe which unit to execute the request other than the requests described in the above "request" field.

In the example shown in FIG. 2, the server name is "sample_server", and the application name is "Scheduler". Also, the conditions in "request/look_schedule_this_week.html" (schedule check request) are as follows. The "normal operation" indicates "processing in client terminal", and the "synchronization storage" indicates that the data to be synchronized is "schedule data for the most recent week in client database A". The "synchronization type" as a synchronizing method is the "copy" that indicates the replica. The "synchronization timing" that is the synchronization time is "everyday 24:00".

Also, the "condition" in "request/write_schedule.cgi" (schedule write Request) is as follows. The "normal operation" is "processing in server apparatus". The "condition" is that "processing is shifted to client terminal when network connection is impossible". The "synchronization storage" for data to be synchronized is "client database B". The "synchronization type" as the synchronizing method is "move" which implies removal after copy. The "synchronization timing" as the synchronization time is "when network becomes connectable". The other condition is "processing in server apparatus".

The "condition" is described by using the operation environment data. When the condition is not satisfied, the normal operation described in the client policy is applied. Also, it is possible to describe a database necessary for each request (granularities are various as in a table unit). The description of this database is required when as the result of data distribution required to distribute a request, the synchronization is carried out to keep the consistence of the data between the client terminal 100 and the server apparatus 200. Also, the synchronization timing and the synchronization type are described for each database. The client database 160 is synchronized with the sever database 260 at the synchronization timing written in the client policy. As the synchronization timing, for example, it is possible to specify that the "synchronization is carried out immediately after the connection to the network" or that the "synchronization is carried out for every constant time". As the "synchronization type", it is possible to specify the "move" method that data are removed from the client database 160 when being transferred to the server apparatus 200, and the "copy" method that has a replica in the client database 160.

The client terminal 100 can select the processing environment of the request from the client process executing section 500 (whether it is processed by the server application execution platform 150 in the client terminal 100 or processed by a server application execution platform 250 in the server apparatus 200), on the basis of a "state of the network connection" that is one of the operation environment data. In short, when the network connection is possible, the server apparatus 200 processes the request, and when the network connection is impossible, it is processed in the client terminal 100. Consequently, the server application can be continuously executed.

When the client terminal 100 is switched from the impossible state of the network connection to the possible state of the network connection, the processing can be seamlessly switched while the consistence of the data is kept, by automatically synchronizing the sever database 260 and the client database 160 that is updated at the time of the processing in the client terminal 100. Also, data that is not required to be synchronized and data that is rarely updated are arranged in the client database 160. Processing that uses those data is carried out in the client terminal 100. Consequently, a network communication quantity can be reduced.

<Sever Apparatus>

The configuration of the server apparatus 200 according to the present exemplary embodiment will be described below. As shown in FIG. 1, the server apparatus 200 according to the present exemplary embodiment includes a server environment data collecting section 210, a system execution control section 220, a server synchronization module 240, a server application execution platform 250, a server environment data, storage section 270 and a server policy storage section 410. The server application execution platform 250 includes a server process executing section 511 and a sever database 260.

The server apparatus 200 is an information processing apparatus for providing information processing service to the user. Also, the server apparatus 200 can transfer a part or whole of the information processing to be executed by the server apparatus 200 to the client terminal 100 on the basis of the operation environment data of the server apparatus 200. For example, the server apparatus 200 can shift a part of the processing to the client terminal 100, when the load of the CPU has increased.

The server environment data storage section 270 stores the operation environment data. The operation environment data is measured, for example, when the server apparatus 200 executes an OS. The operation environment data is updated at any time by the OS. The operation environment data indicates a state of the operation environment of the server apparatus 200 and includes at least one of a CPU use rate, a memory use rate, a hard disc use rate, a connection state of a network line, and a network line transmission rate.

The server environment data collecting section 210 acquires the operation environment data of the server apparatus 200 from the server environment data storage section 270. The server environment data collecting section 210 may acquire the operation environment data by measuring the operation environment of the server apparatus 200. Also, the operation environment data that cannot be measured by the OS is measured by the server environment data collecting section 210.

The server policy storage section 410 stores the server policy as the criteria for the system execution control section 220 to determine whether the information processing corresponding to a request (for example, the reading request of the data in which URL is specified and the like) issued from the executing section 500 should be performed by the client terminal 100 or server apparatus 200. Also, the server policy storage section 410 may include the criteria such as data for specifying the storage section used when the client terminal 100 or the server apparatus 200 processes the above request, and a synchronizing method and synchronization timing between the storage sections.

The system execution control section 220 determines which of the sever apparatus 200 and the client terminal 100 should process the request, on the basis of the result of the comparison between the operation environment data of the server apparatus 200 and the criteria. The server synchronization module 240 carries out the synchronization of the respective storage sections described in the server policy storage section 410, on the basis of the determination result of whether or not the synchronization is carried out by the system execution control section 220.

FIG. 3 shows one example of the server policy. The server policy shown in FIG. 3 defines "Normal operation", "condition", and "synchronization required storage", in association with data ("/function.cgi" in the example of FIG. 3) that specifies each request issued from the client process executing section 500 to the server apparatus 200. The "Normal Operation" field describes the first candidate of a unit to process the request.

The "condition" field is used to describe a secondary candidate to process the request and a condition that the secondary candidate is selected. When the operation environment data of the server apparatus 200 satisfies this condition, the secondary candidate is selected. It should be noted that when the "condition" field has no description, the firstly candidate is selected as the unit to process the request. The "condition" is described by using the operation environment data. In FIG. 3, the detail of the normal operation is described, and the switching condition from the server apparatus 200 to the client terminal 100 is described. For example, a case that a 5-minute average of load on a CPU contained in the server apparatus 200 exceeds 90% is set as the "condition". The necessity of the synchronization is also described. The other contents of the server policy are similar to those of the client policy. The "synchronization required storage" field is used to describe data indicating the storage sections of the server apparatus 200, which is required to be made coincident (synchronous) with the client terminal 100, with regard to the content.

Subsequently, the operation of this system will be described in detail with reference to FIGS. 6 to 11.

<Initial Setting Process>

An initial setting process includes a distributing (assigning) process of a request issued from the executing section 500 of the client process and a synchronizing process between the storage section of the client terminal 100 and the storage section of the server apparatus 200. It should be noted that the initial setting process according to the present exemplary embodiment is periodically executed for each predetermined time period. However, this may be executed in response to an operation of the client terminal 100 by the user as a trigger. Also, this may be executed in response to a command transmitted from an external equipment (not shown) connected to the network 300.

Figure 6:
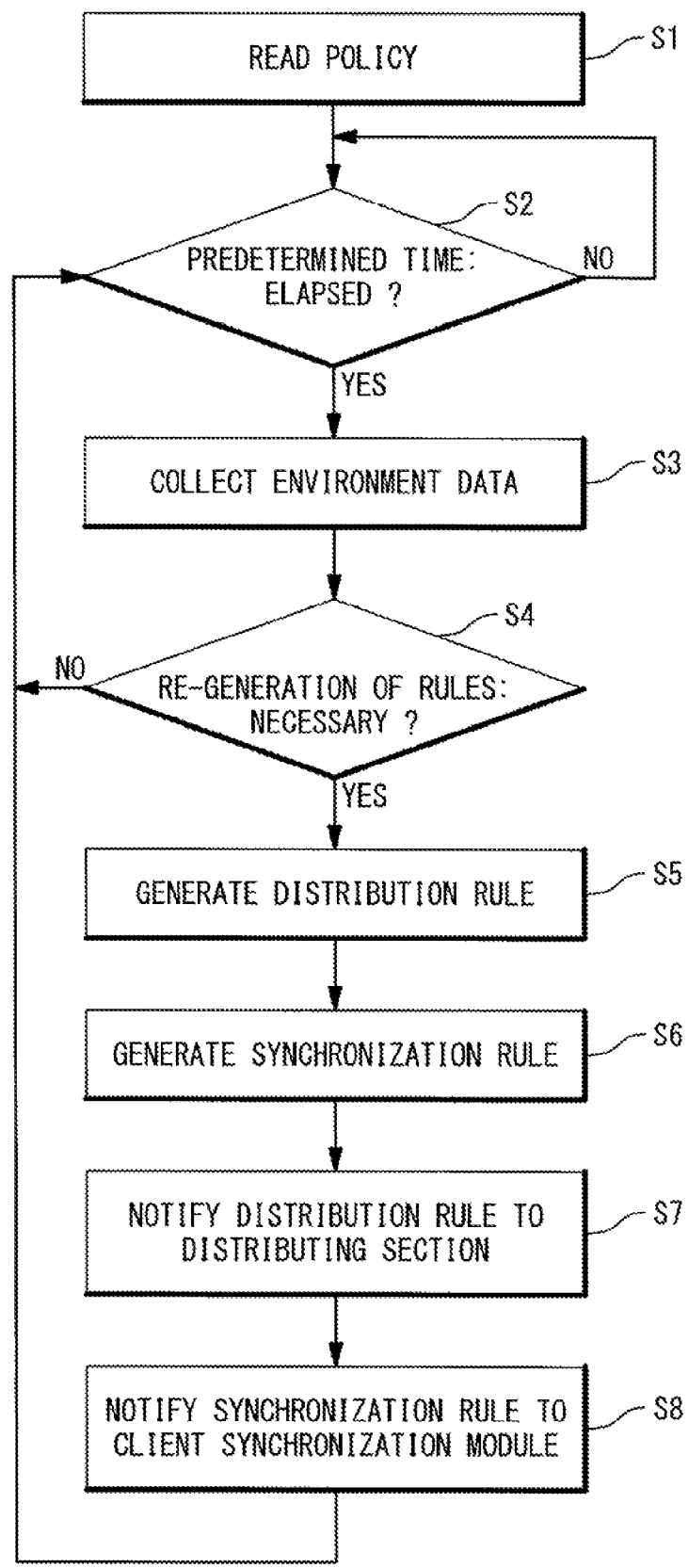
FIG. 6 is a flowchart showing an operation of a client-execution control section in the present invention.

With reference to FIG. 6, when the client terminal 100 is started, at first, the client execution control section 120 reads policy data from the client policy storage section 400 (Step S1). Subsequently, the client execution control section 120 waits for elapse of a predetermined time period (Step S2). When the predetermined time period has elapsed, the client environment data collecting section 110 collects the operation environment data (Step S3). The collected operation environment data is stored in the client environment data storage section 170. The client execution control section 120 detects whether or not a condition different from the condition for an existing rule is generated, on the basis of the collected operation environment data and the client policy. In this way, the client execution control section 120 determines the requirement of re-generation of the rules (Step S4). When the re-generation of the rules is not required, an operation flow returns to the step S2. When the rule re-generation is determined to be required, the client execution control section 120 generates a distribution rule on the basis of the client policy (Step S5). Subsequently, the client execution control section 120 generates a synchronization rule required to synchronize the databases on the basis of the client policy (Step S6). Here, the client execution control section 120 notifies the generated distribution rules to the distributing section 130 (Step S7). Also, the client execution control section 120 notifies the synchronization rule to the client synchronization module 140 (Step S8). After they are notified, the operation flow returns to the step S2.

<Distributing Process>

Figure 7:
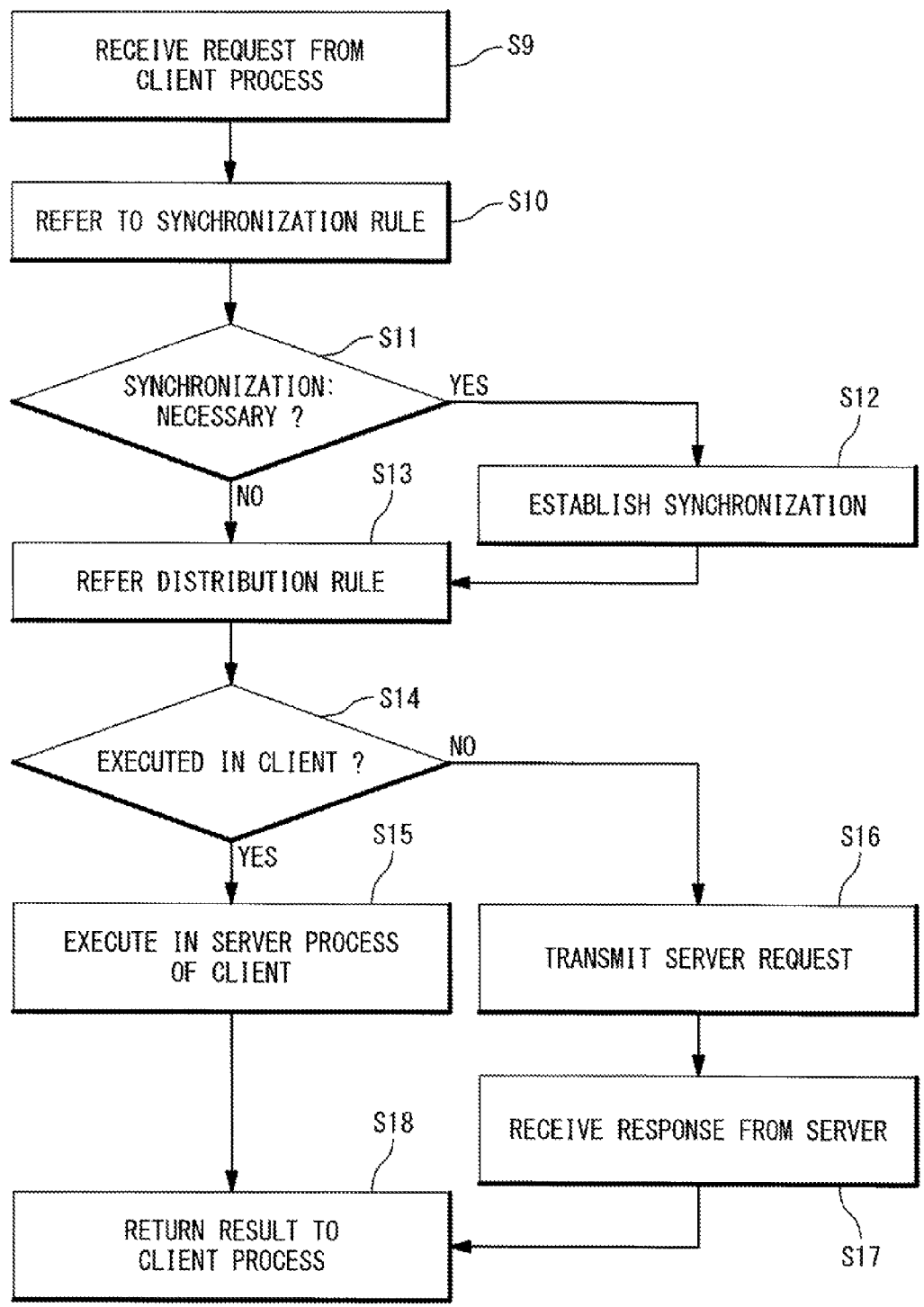
FIG. 7 is a flowchart showing an operation of a client processing in the present invention.
Figure 8:
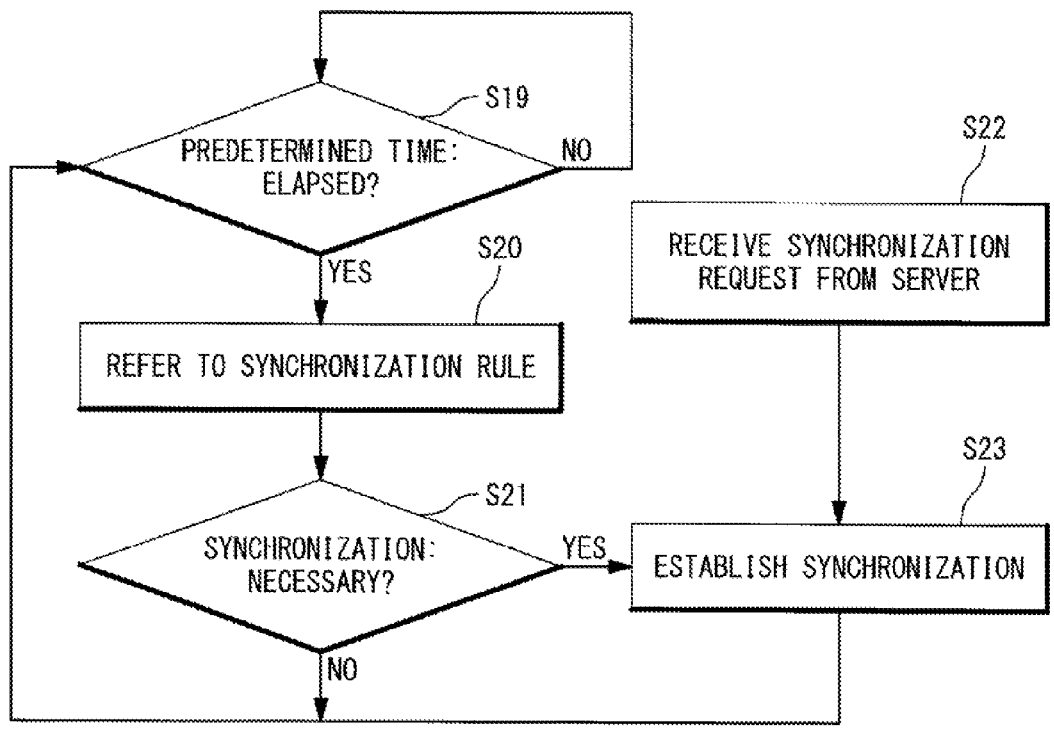
FIG. 8 is a flowchart showing an operation of a client synchronization module in the present invention.

Subsequently, the distributing process executed by the distributing section 130 in the client terminal 100 will be described with reference to FIG. 7. In the distributing process, the distributing section 130 receives the request issued from the client process executing section 500 (Step S9). The distributing section 130 refers to the synchronization rule in the client synchronization module 140 (Step S10). The requirement of synchronization is determined from the synchronization rule that is referred to by the distributing section 130 and the request received from the client process executing section 500 (Step S11). When the requirement of synchronization is determined, the client synchronization module 140 sends a client synchronization request to the server synchronization module 240 of the server apparatus 200, in order to establish the synchronization between the client database 160 and the sever database 260 (Step S12). The server synchronization module 240 reads a part of the data of the sever database 260 in response to the client synchronization request to transmit through the network 300 to the client synchronization module 140 of the client terminal 100. The client synchronization module 140 stores data received from the server apparatus 200, in the client database 160. In this way, the synchronization is established. If at the step S11, the synchronization is not required to be established, and after the processing of the step S12, a step S13 is executed. Then, the distributing section 130 refers to the distribution rule (Step S13). The distributing section 130 determines whether the request should be processed by the client terminal 100 or by the server apparatus 200, on the basis of the distribution rule (Step S14). If the request should be processed by the client terminal 100, the server process executing section 511 of the client terminal 100 processes the request (Step S15). Subsequently, the processing result is returned to the client process (Step S18). If the request is not processed by the client terminal 100, the distributing section 130 sends the request to the server process executing section 511 (Step S16). Subsequently, the distributing section 130 receives the processing result (response) of the request from the server apparatus 200 (Step S17). Then, the processing result is sent back to the client process executing section 500 (Step S18).

<Synchronizing Process Executed by Client Terminal>

Subsequently, the synchronizing process executed by the client terminal 100 will be described. The client synchronization module 140 waits for the elapse of a predetermined time period (Step S19). Subsequently, the client synchronization module 140 refers to the synchronization rule (Step S20) and determines whether or not the synchronization is required (Step S21). It the synchronization is determined not to be required, the operation flow returns to the step S19, and the elapse of the predetermined time period is waited for. On the other hand, if the synchronization is determined to be required, the client synchronization module 140 transmits a client synchronization request to the server synchronization module 240 of the server apparatus 200 in order to establish the synchronization. In this way, as mentioned above, the synchronization is established (Step S23). In addition, when receiving the server synchronization request from the server apparatus 200, the client synchronization module 140 executes the synchronizing process (Step S23). In this case, the client synchronization module 140 reads data, which is required to establish the synchronization, from the client database 160 to transmit to the server synchronization module 240. The server synchronization module 240 stores the received data in the sever database 260. In the client terminal, there is a case that the client database 160 is kept as it is, and there is a case that the read data is removed.

<Synchronization Rule Providing Process>

Figure 9:
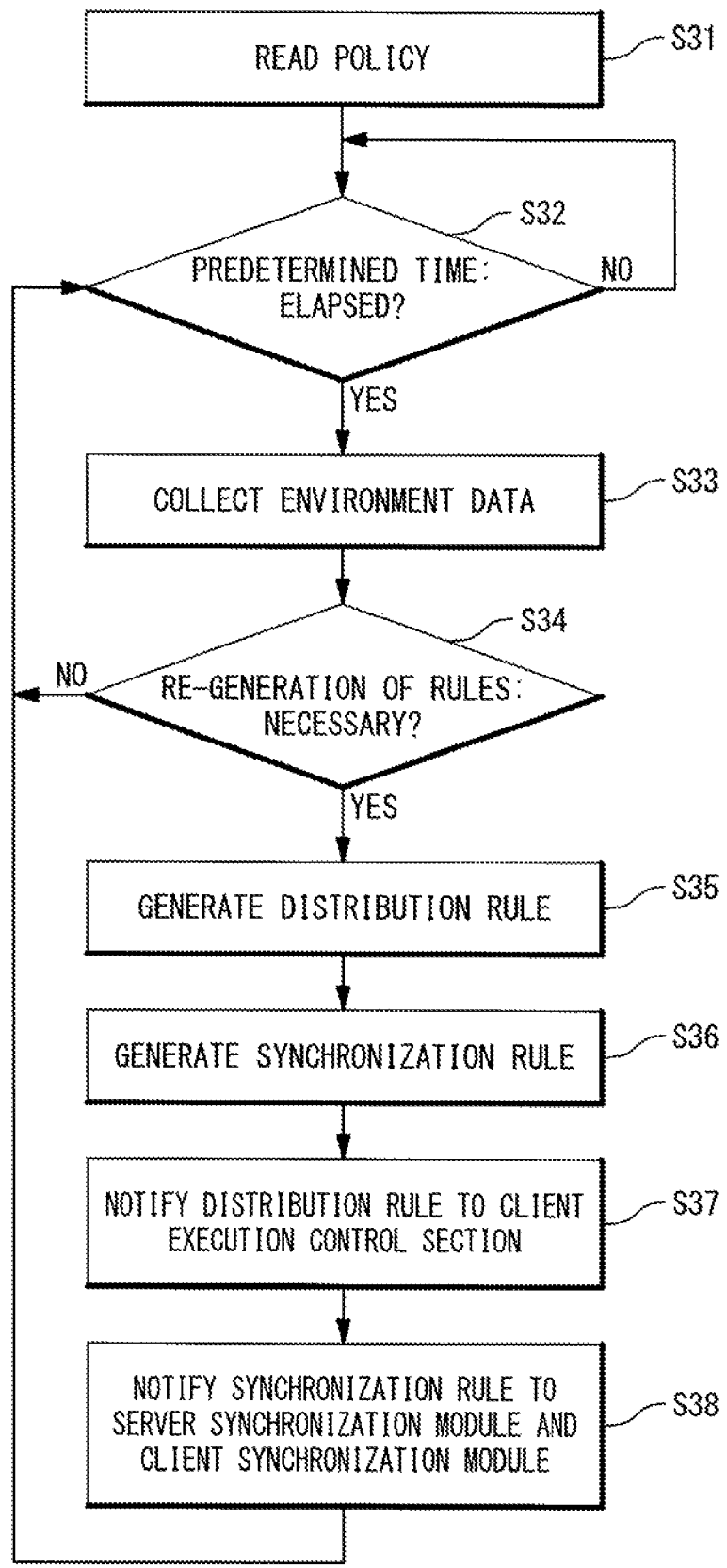
FIG. 9 is a flowchart showing an operation of a system execution control section in the present invention.

Subsequently, the operational flow in which the synchronization rule is provided to the server synchronization module 240 in the server apparatus 200 and the client synchronization module 140 in the client terminal 100 will be described by reference to FIG. 9.

The system execution control section 220 reads and interprets the server policy stored in the storage section 410 of the server apparatus (Step S31). After that, the system execution control section 220 waits for the elapse of a predetermined time period (Step S32). When the predetermined time has elapsed, the server environment data collecting section 210 collects the operation environment data (Step S33). The collected operation environment data is stored in the server environment data storage section 270. The system execution control section 220 detects whether or not a condition different from a condition for an existing rule is generated, on the basis of the collected operation environment data and the server policy. In this way, the system execution control section 220 determines the requirement of re-generation of rules (Step S34). If the re-generation of the rules is not required, the operational flow returns to the step S32. If the re-generation of the rules is determined to be required, the system execution control section 220 generates a distribution rule (Step S35). Subsequently, the system execution control section 220 generates a synchronization rule required to synchronize the databases (Step S36). Here, the system execution control section 220 notifies the generated distribution rule to the client execution control section 120 (Step S37). Also, the system execution control section 220 notifies the synchronization rule to the server synchronization module 240 and the client synchronization module 140 through the client execution control section 120 (Step S38). After the rules are notified, the operational flow returns to the step S32.

<Processing of Server Process>

Figure 10:
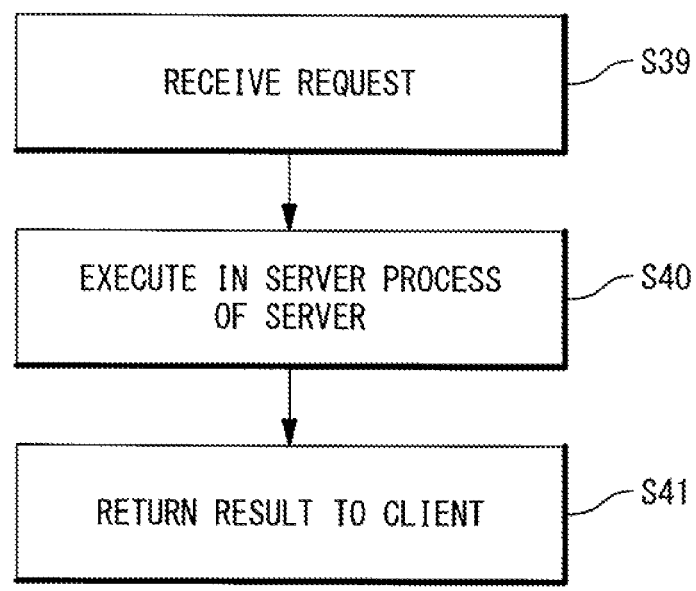
FIG. 10 is a flowchart showing an operation of a server process executing section in the present invention.

The operation of the server process executing section 511 will be described below with reference to FIG. 10. The server process executing section 511 receives a request from the distributing section 130 in the client terminal 100 (Step S39) and processes the request (Step S40). The server process executing section 511 returns the processing result of the request to the distributing section 130 of the client terminal 100 (Step S41).

<Flow of Synchronizing Process Executed by Sever Apparatus>

Figure 11:
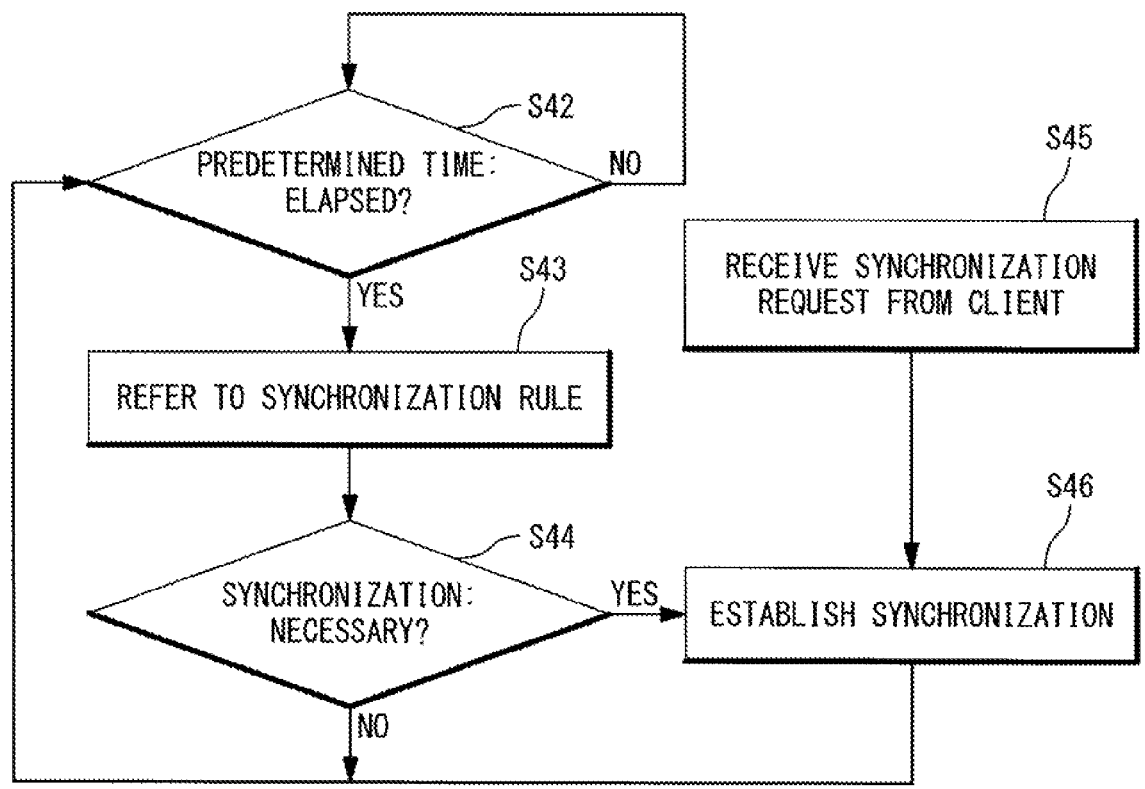
FIG. 11 is a flowchart showing an operation of a server synchronization module in the present invention.

The synchronizing process executed by the server apparatus 200 will be described below with reference to FIG. 11.

The server synchronization module 240 establishes the synchronization between the server apparatus 200 and the client terminal 100 in accordance with the synchronization rule received from the system execution control section 220. In detail, the synchronization is carried out through the network 300 between the server synchronization module 240 and the client synchronization module 140 (Step S46). The synchronization is carried out between a part or whole of the client database 160 and a part or whole of the sever database 260. Moreover, the server synchronization module 240 can periodically execute the synchronization (Step S42) in accordance with the synchronization rule (Step S43). In short, the server synchronization module 240 waits for the elapse of a predetermined time period (Step S42). Subsequently, the server synchronization module 240 refers to the synchronization rule (Step S43) and determines whether or not the synchronization is required (Step S44). If the synchronization is determined to be required, the server synchronization module 240 carries out the synchronization (Step S46). On the other hand, the server synchronization module 240 executes the synchronization, even if receiving the synchronization request from the client terminal 100 (Step S46). After that, the operational flow returns to the step S42, and the elapse of the predetermined time period is waited for.

By using those mechanisms, when the load on the server apparatus 200 has increased, as necessary, a part of the processing on the server apparatus 200 is transferred through the system execution control section 220 to the client terminal 100. Thus, the load can be quickly distributed. Also, in the client terminal 100, since the thus-transferred processing is not required through the network 300, the result can be displayed at a high speed.

Also, as shown in FIG. 1, the server application execution platforms 150 and 250 in the client terminal 100 and the server apparatus 200 are configured independently of the other modules. Thus, the existing server applications can be used without any change. Therefore, the introduction cost of the present invention can be reduced.

As mentioned above, the best mode of carrying out the invention has been described. However, the above-mentioned exemplary embodiment is intended to make the understanding of the present invention easy, and the present invention should not be limitedly construed. The present invention can be modified and improved without departing from the scope, and the present invention includes the modification.

This application is the National Phase of PCT/JP2009/058946, filed May 13, 2009, which claims a priority on convention based on Japanese Patent Application No. (JP 2008-127759). The disclosure thereof is incorporated herein by reference.

The invention claimed is:

1. An information processing system comprising a client terminal and a server apparatus which are connected through a network, wherein said client terminal comprises:
   a client database; and
   a first processor, the first processor comprising:
   a client process executing section configured to issue a request;
   a client execution control section configured to generate a distribution rule and a synchronization rule based on an operation environment data of said client terminal, a client policy and an instruction from said server apparatus;
   a distributing section configured to determine whether or not said request should be processed by said client terminal or by said server apparatus, based on said distribution rule, distribute said request to said server apparatus when it is determined that said request should be processed by said server apparatus, and return a received processing result to said client process executing section; and
   a client side server process executing section configured to execute said request when it is determined when said request should be processed by said client terminal, and notify a processing result to said distributing section,
   wherein said server apparatus comprises:
   a server database; and
   a second processor, the second processor comprising:
   a server side server process executing section configured to execute said request received from said client terminal through said network and notify a processing result to said distributing section; and
   a system execution control section configured to issue said instruction to said client execution control section based on operation environment data of said server apparatus,
   wherein said client database and said server database store common data, and
   wherein said first processor further comprises a client synchronization module, and said second processor further comprises a server synchronization module,
   wherein said client synchronization module and said server synchronization module execute a synchronizing process through cooperation to synchronize the whole or a part of said client database with the whole or a part of said server database,
   wherein said client execution control section controls said distributing section and said client synchronization module based on the operation environment data of said client terminal and said client policy, and
   wherein said system execution control section generates said distribution rule and said synchronization rule based on the operation environment data of said server apparatus and a server policy and transmits said instruction to said client terminal.

2. The information processing system according to claim 1, wherein said operation environment data includes at least one of a CPU use rate, an execution memory use rate, a hard disk use rate, a state of a network line, and a network line transmission rate.

3. The information processing system according to claim 1, wherein said client terminal further comprises:
   a client environmental data storage section; and
   the first processor comprises a client environmental data collecting section configured to collect the operation environment data of said client terminal to store in said client environmental data storage section, and
   wherein said server apparatus comprises:
   a server environmental data storage section; and
   the second processor comprises a server environmental data collecting section configured to collect the operation environment data of said server apparatus to store in said server environmental data storage section.

4. The information processing system according to claim 1, wherein said client terminal has said client policy in which a distributing method of said request from said client process and a synchronizing method of said client database and said server database are described, and
   wherein said server apparatus has a said server policy in which a distributing method of said request from said client process and a synchronizing method of said client database and said server database are described.

5. An information processing method, which comprises a client terminal having a client database and a server apparatus having a server database, wherein said client terminal and said server apparatus are connected through a network, said method comprising:
   issuing an instruction from said server apparatus to said client terminal based on operation environment data of said server apparatus;
   generating a distribution rule and a synchronization rule based on an operation environment data of said client terminal, a client policy and an instruction from said server apparatus;
   executing a client process in said client terminal to issue a request;
   determining whether said request should be processed by said client terminal or by said server apparatus, based on said distribution rule in said client terminal;
   executing said request in said client terminal when it is determined that said request should be processed by said client terminal and returning a processing result to a client process;

executing said request in said server apparatus when it is determined that said request should be processed by said server apparatus and returning a processing result to said client process;

executing a synchronizing process to synchronize the whole or a part of said client database with the whole or a part of said server database through cooperation of said client terminal and said server apparatus, wherein said client database and said server database store common data, wherein said determining comprises:

determining whether said request should be processed by said client terminal or by said server apparatus, based on said client distribution rule, and wherein said executing said synchronizing process comprises:

controlling synchronization between said client database and said server database based on the operation environment data of said client terminal and said client policy, and wherein said generating comprises:

generating said distribution rule and said synchronization rule based on the operation environment data of said server apparatus and a server policy and transmits said instruction to said client terminal.

6. The information processing method according to claim 5, wherein said operation environment data includes at least one of a CPU use rate, an execution memory use rate, a hard disk use rate, a state of a network line, and a network line transmission rate.

7. The information processing method according to claim 5, further comprising:

collecting the operation environment data of said client terminal; and collecting the operation environment data of said server apparatus.

8. The information processing method according to claim 5, wherein said client terminal has a said client policy in which a distributing method of said request from said client process, and a synchronizing method of said client database with said server database are described, and wherein said server apparatus has said server policy in which a distributing method of said request from said client process, and a synchronizing method of said client database with said server database, are described.

9. A non-transitory computer-readable recording medium in which computer-executable program code is recorded to attain an information processing method which comprises a client terminal having a client database and a server apparatus having a server database, wherein said client terminal and said server apparatus are connected through a network, said method comprising:

issuing an instruction from said server apparatus to said client terminal based on operation environment data of said server apparatus;

generating a distribution rule and a synchronization rule based on an operation environment data of said client terminal, a client policy and an instruction from said server apparatus;

executing a client process in said client terminal to issue a request;

determining whether said request should be processed by said client terminal or by said server apparatus, based on said distribution rule in said client terminal;

executing said request in said client terminal when it is determined that said request should be processed by said client terminal and returning a processing result to a client process;

executing said request in said server apparatus when it is determined that said request should be processed by said server apparatus and returning a processing result to said client process; and executing a synchronizing process to synchronize the whole or a part of said client database with the whole or a part of said server database through cooperation of said client terminal and said server apparatus, wherein said client database and said server database store common data, wherein said determining comprises:

determining whether said request should be processed by said client terminal or by said server apparatus, based on said client distribution rule, and wherein said executing said synchronizing process comprises:

controlling synchronization between said client database and said server database based on the operation environment data of said client terminal and said client policy, and wherein said generating comprises:

generating said distribution rule and said synchronization rule based on the operation environment data of said server apparatus and a server policy and transmits said instruction to said client terminal.

10. The non-transitory computer-readable recording medium according to claim 9, wherein said operation environment data includes at least one of a CPU use rate, an execution memory use rate, a hard disk use rate, a state of a network line, and a network line transmission rate.

11. The non-transitory computer-readable recording medium according to claim 9, wherein said information processing method further comprises:

collecting the operation environment data of said client terminal; and collecting the operation environment data of said server apparatus.

12. The non-transitory computer-readable recording medium according to claim 9, wherein said client terminal has a said client policy in which a distributing method of said request from said client process, and a synchronizing method of said client database with said server database are described, and wherein said server apparatus has a said server policy in which a distributing method of said request from said client process, and a synchronizing method of said client database with said server database are described.

* * * * *